Nov. 28, 1933.  L. A. LINDSEY  1,936,723
ICE CREAM FREEZER
Filed Sept. 9, 1931  3 Sheets-Sheet 2
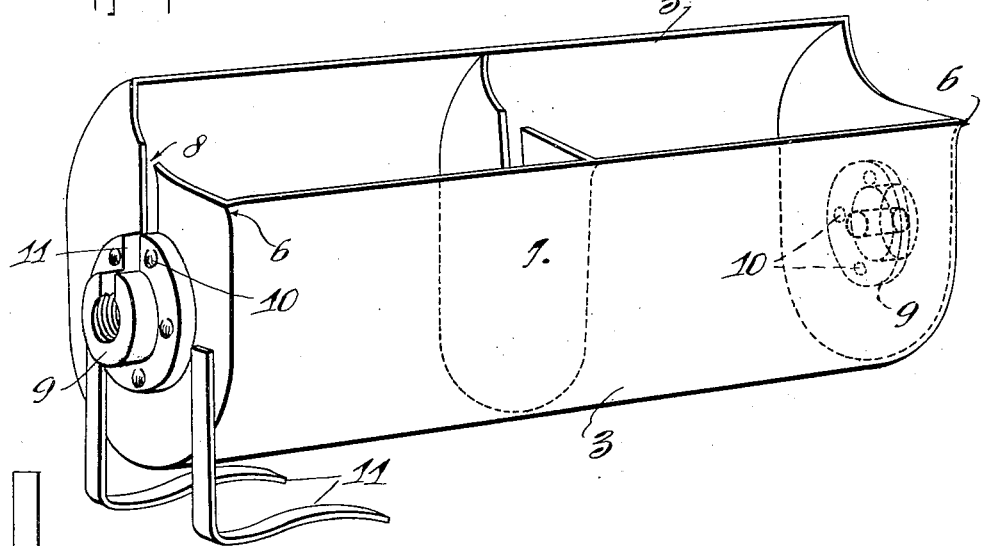
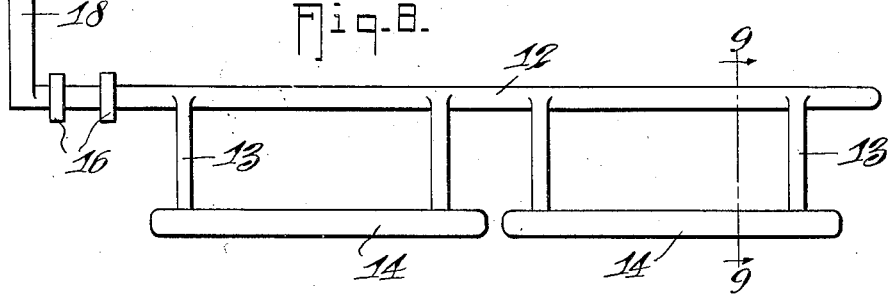
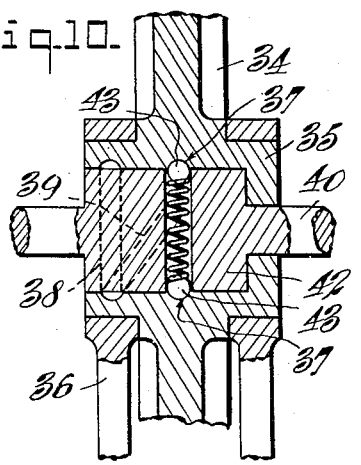
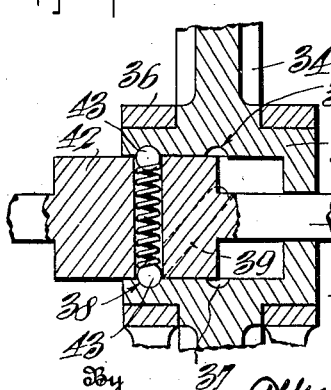
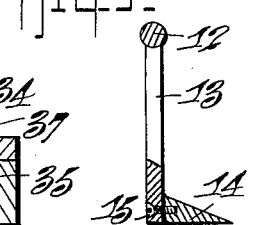
Inventor
L. A. Lindsey.

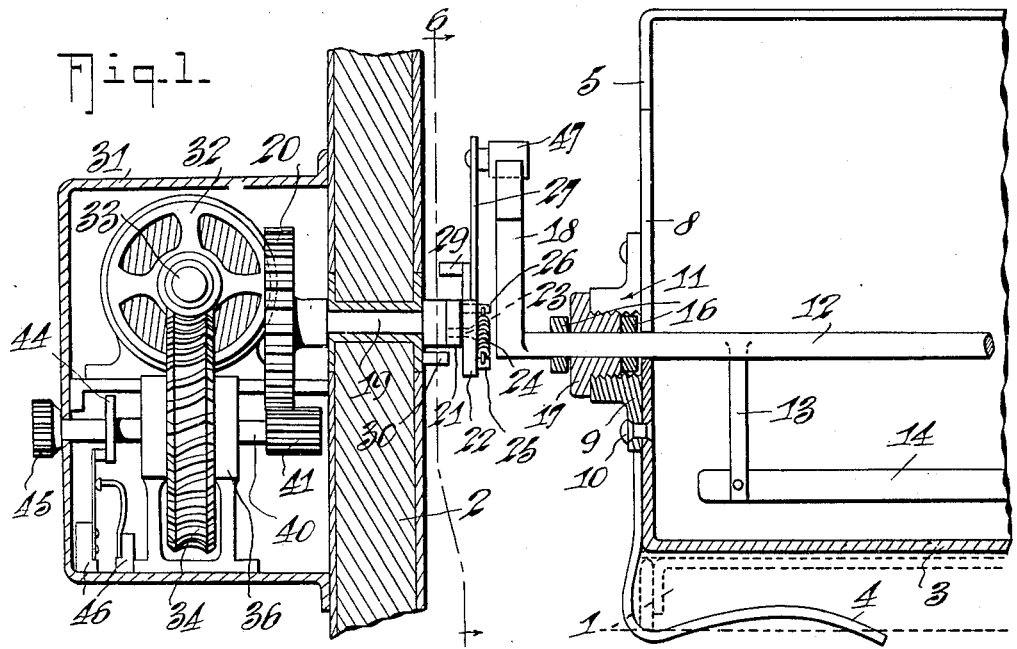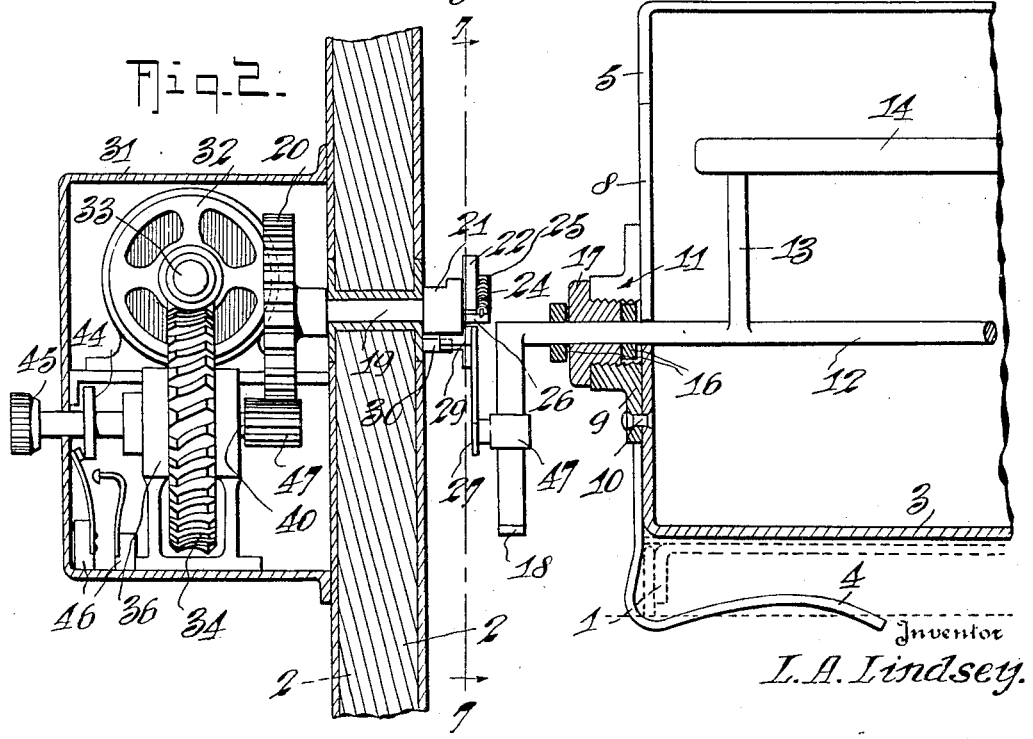

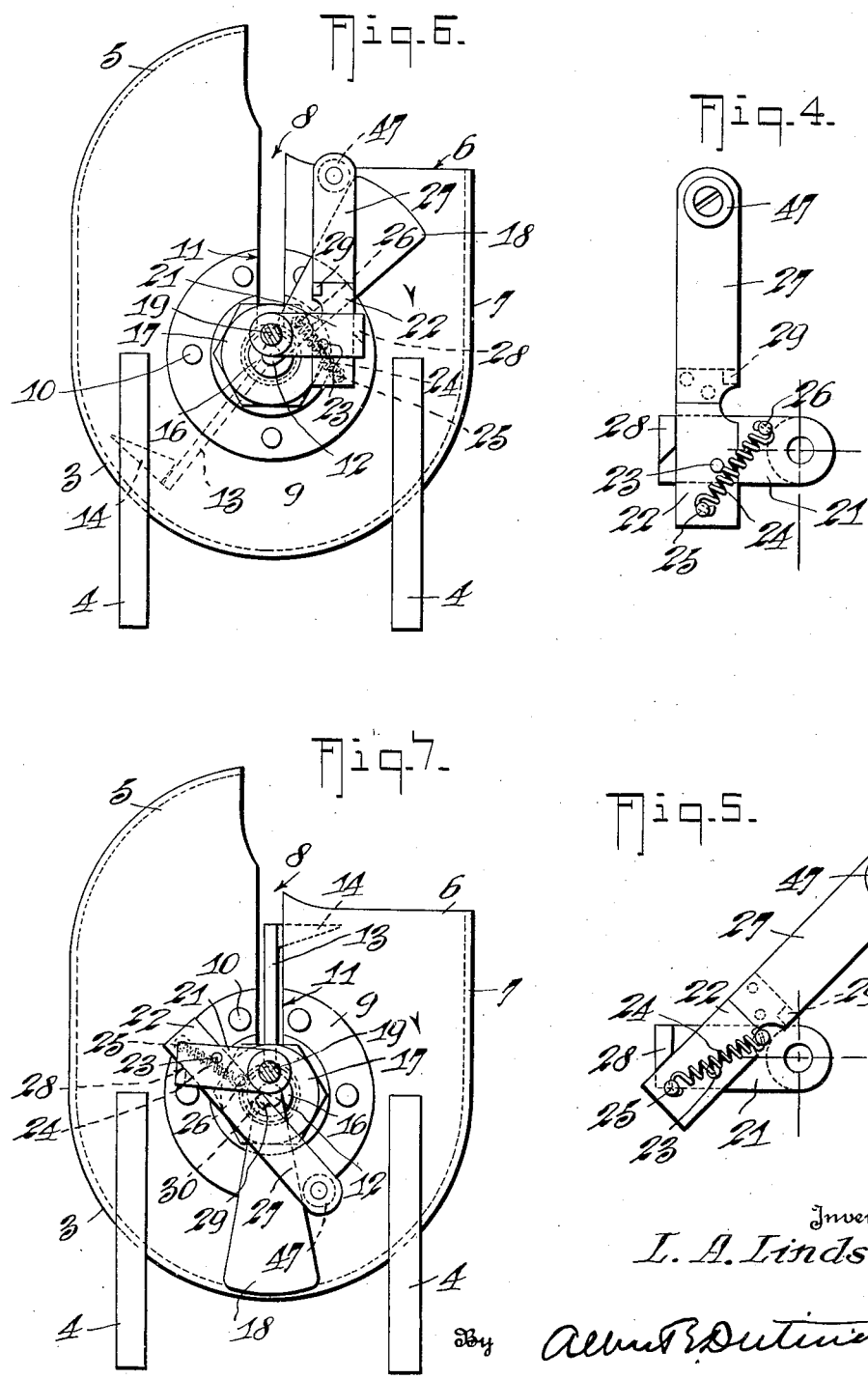

Patented Nov. 28, 1933

1,936,723

UNITED STATES PATENT OFFICE 1,936,723

ICE CREAM FREEZER

Lucius A. Lindsey, Atlanta, Ga.

Application September 9, 1931. Serial No. 561,943

13 Claims. (Cl. 259—110)

My invention relates to freezing ice cream, sherbets, etc. in the freezing units of mechanical refrigerators, especially electric refrigerators such as the General Electric, Westinghouse, Frigidaire and other similar types.

It is well known that in freezing ice cream, sherbets, etc. in these refrigerators it is difficult to obtain a smoothly frozen mixture as the material has a tendency in still freezing to crystallize. As a result it is necessary frequently to remove the pan containing the material to be frozen at intervals and stir the contents. This is not only more or less of a nuisance but it increases the expense due to the removal of the receptacle from the refrigerator and its replacement which requires opening and closing of the door with the consequent temperature rise that makes it necessary for the refrigerating motor to function through a longer period of time than would otherwise be the case.

Primarily the invention has for an object to provide a simple, effective and inexpensive apparatus for attachment to the refrigerator, which attachment includes a suitably shaped pan with a rotating dasher or stirring paddle that is insertable in the refrigerator unit in place of the pans now used for freezing ice cubes, etc.

Further, the invention has for an object to provide a freezer whose paddle will be revolved to a position entirely out of the contents of the pan when the paddle operating unit ceases to function or when the material has been sufficiently hardened in the pan.

Further, the invention has for an object to provide an automatic means to shut off the driving motor as soon as the material in the pan shall have become of the required consistency.

Further, it is an object to provide a freezer whose driving motor is located outside of the refrigerator so that its heat will not tend to raise the temperature of the refrigerating chamber or that of the refrigerator unit.

Further, it is an object to provide a pan which will not spill its contents while in operation or permit the contents to be splashed onto the walls of the freezing unit.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawings, in which:—

Figure 1 is a side elevation of my invention in the running position, the associated refrigerator parts being indicated in dotted lines.

Figure 2 is a view similar to Figure 1 with the parts in the position they assume when the contents of the pan has been sufficiently hardened.

Figure 3 is a detail perspective view of the pan per se.

Figures 4 and 5 are detail views of the articulated driving crank arm.

Figure 6 is a cross section on the line 6—6 of Figure 1.

Figure 7 is a cross section on the line 7—7 of Figure 2.

Figure 8 is a side elevation of the paddle per se.

Figure 9 is an enlarged cross section on the line 9—9 of Figure 8.

Figure 10 is an enlarged detail vertical section of the clutch parts in the running position.

Figure 11 is an enlarged detail vertical section of the clutch parts in the position they assume when the contents have been hardened sufficiently.

In the drawings in which like numerals of reference indicate like parts in all of the figures, 1 represents the freezing unit of the refrigerator and 2 the door of the refrigerating cabinet.

In carrying out my invention I provide a pan 3 of generally cylindrical form, approximately an upper quarter being removed. The pan is provided with suitable clips 4 by means of which it may be held in the refrigerating unit.

One longitudinal portion of the pan is extended above the axis of the cylinder to comprise a hood 5, this being located on the up-going side with relation to the paddle movement. The portion of the longitudinal face of the pan opposite the hood and above the level of the paddle axle, is extended straight up as at 7 and the ends adjacent thereto are flared outwardly as at 6, the purpose of which will presently be explained. One end is also provided with a vertical slot 8 through which the paddle shaft 12 may be brought into operative position. At each end the pan carries a bearing bushing 9, the front one of which is slotted at 11 for the passage of the shaft. The bushing 9 at the front end is internally threaded to receive the externally threaded bushing 17 forming a bearing for the paddle shaft 12, the bushing 17 being permanently located on the shaft 12 between collars 16. The bushing at the opposite end of the pan need not be provided with a slot 11 but simply provided with a bearing bore for the free end of the shaft 12. Thus, by dropping the shaft 12 through the slots 8 and 11, guiding the free end of the shaft 12 into its bearing and screwing the bushing 17 into the bushing 9, an adequate bearing for the paddle shaft in the pan is provided. The bushings 9 are secured to the pan permanently by rivets 10.

The paddle consists of the shaft from which arms 13 radiate and to which arms 13 the paddle blade 14 is secured loosely with screws 15, leaving the blade free to be forced outwardly by the pressure of the cream against the beveled inside face of the paddle.

The shaft 12 is provided with a weighted crank arm 18 at its forward end and cooperates with the power unit now to be described. The power unit consists of a driving crank shaft 19 journalled in a suitable bearing in the wall or door of the refrigerator and carrying a gear 20 which meshes with the pinion 41 of the clutch shaft 40 hereinafter again referred to.

The shaft 19 carries an articulated crank arm composed of a fixed section 21 and a swingable section 22, the two sections being pivoted together as at 23 and adapted to have articulation in one direction limited by a stop and in the other direction by the shaft itself. A toggle spring 24 is anchored at 25 to the section 22, and at 26 to the section 21 so as to hold the movable or swingable crank arm section in either of two positions.

The swingable arm section includes a leaf spring portion 27 which carries the knob or roller 47 to engage the crank arm 18 of the paddle when the parts are assembled in their operative relationship.

The stop lug 28 is carried by the swingable member 22 of the articulated arm, and is adapted when that arm is in position shown in Figure 5, to lie in the path of a fixed stop lug 30 located on the wall or door of the refrigerator so that when the two stop lugs come together rotation of the shaft 19 will be arrested.

31 is a suitable support for the driving unit which is adapted to be mounted on the outside of the door of the refrigerator and carries a motor 32 having a worm 33 to mesh with the worm gear 34 whose hub 35 constitutes one element of a clutch device. The hub 35 is mounted in suitable bearings 36 and has clutch ball sockets 37, an annular free race 38 and a diagonal or spiral shifting race 39 to cooperate with the shiftable clutch collar 42 and the clutch balls 43 thereof.

The clutch shaft 40 carries a collar 44 that operates as a circuit breaker in cooperation with the motor circuit opening and closing member 46. The member 46 will be operated by the collar 44 to either open or close the motor circuit accordingly as the shaft 40 is in one position or another.

The shaft 40 is adapted to be pushed to its operating or clutching position through the medium of a button or head 45 on the protruding end of the shaft.

So far as described the manner in which my invention operates is as follows:

The power unit comprising the parts 19 et seq. is, as before stated, mounted on a wall or door of the refrigerator, preferably the door, so that the apparatus may be worked from the front of the machine. When mounted on the door or wall the shaft 19 is located at a slightly higher level than the axis of the agitator shaft 12 to allow for variation in the position of that shaft due to the presence or absence of frost on the freezing unit. Another purpose of locating the shaft 19 above the shaft 12 is in order that a differential movement may be imparted to the paddle, i. e., when so positioned the shaft 19 will drive the shaft 12 more powerfully, and cause it to travel more rapidly when out of the mixture.

Assume that the material has been placed in the pan, the paddle properly located and the pan unit inserted into the freezing unit. When in this position the counterweighted crank 18 will hold the paddle up out of the material. The door is then closed. If, in closing the door, the end of the roller 47 should engage the front of the weighted crank 18 no damage will be done because the spring part 27 will give sufficiently. The operator then presses in on the button 45 to bring the clutch into engaging position with its balls 43 in the sockets 37. This at the same time permits the circuit maker 46 to close the motor circuit and start the parts to operate. As soon as the motor circuit shall have been closed the shaft 19 will turn and in doing so the roller 47 will clear off the face of the crank 18 and snap back into a position in alignment with the side of the crank. As soon as the roller 47 engages the crank motion will be imparted to the dasher which continues until the material shall have been chilled to a predetermined degree of hardness, whereupon the resistance to rotation of the shaft 12 being transmitted to the articulated crank arm will overcome the tension of the toggle spring 24 and permit the articulated arm to assume the angular position shown in Figure 5. This brings the lug 29 into the path of the lug 30 so that when 29 comes into engagement with 30 the motion of the shaft 19 will be stopped, consequently the clutch balls will run out of the sockets 37 into the diagonal grooves 39 and the clutch be shifted over into the free running groove 38. In shifting over into the free running groove 38 the collar 44 will have engaged the circuit opening and closing device 46 to open the circuit of the motor, thus stopping operation. It should be understood that the lug 30 is so located as to be engaged by the lug 29 when the articulated arm is in such a position that the counterweighted arm 18 will perform its function and hold the paddle up out of the contents of the pan. The parts may be left in this position until one is ready to serve the frozen cream. The pan unit is then removed and the paddle lifted off. The pan unit may then be set down on a table or other support on which it is prevented from turning over by reason of the clips 4 serving as legs.

By flaring the ends of the pan as at 6, from the center to the paddle entering side slightly outwardly, it prevents the cream slopping over the ends as the paddle enters on its downward stroke.

If desired the pan may be divided by suitable cross-partitions into a number of compartments, in which event the paddle blade will be similarly sub-divided.

From the foregoing description, taken in connection with the accompanying drawings, it is thought the complete construction, operation and advantages of my invention will be clear to those skilled in the art to which it relates.

What I claim is:

1. In combination with the freezing unit and door of a refrigerator, of a pan insertable into the freezing unit, a rotatable scraper paddle in the pan, and a power applying unit mounted on the door for actuating said paddle when the door is closed, and means for automatically stopping the paddle and holding it out of the contents of the pan when said power applying unit ceases its function.

2. In combination with the freezing unit and door of a refrigerator, of a pan insertable into the freezing unit, a rotatable scraper-paddle in the pan, a power applying unit mounted on the door for actuating said paddle when the door is closed, said power applying unit including an electric motor, a gear train, and a driving crank shaft, and means to automatically stop the motor on the application of a predetermined resistance to the turning of said paddle, and means for automatically stopping the paddle and holding it out of the contents of the pan when said power applying unit ceases to function.

3. In refrigerator ice cream freezers, a freezing pan insertable into the freezing unit of a refrigerator, a paddle rotatable in the pan, means for automatically holding the paddle out of the contents of the pan when the paddle is not being operated, and means to hold the pan to the freezing unit, said paddle holding means including a counterweight for the paddle.

4. In refrigerator ice cream freezers, a freezing pan insertable into the freezing unit of a refrigerator, a single paddle rotatable in the pan, counterbalancing means for automatically holding the paddle out of the contents of the pan when the paddle is not being operated, and means to hold the pan to the freezing unit, said pan having a semi-cylindrical lower part, a straight side and a hooded side and outwardly flared end portions for the purposes specified.

5. In refrigerator ice cream freezers, a freezing pan insertable into the freezing unit of a refrigerator, a paddle rotatable in the pan, means for holding the paddle out of the contents of the pan when the paddle is not being operated, and means to hold the pan to the freezing unit, said paddle holding means including a counterweight for the paddle, said pan having a semi-cylindrical lower part, a straight side and a hooded side and outwardly flared end portions for the purposes specified.

6. In an ice cream freezer for mechanical refrigerators having freezing units, a pan unit and a power unit, means holding said pan unit in the freezing unit of a refrigerator, means holding said power unit on the door of the refrigerator to cooperate with the pan unit, said power unit comprising a motor, a gear train including a clutch device having means to release itself upon a predetermined resistance being encountered, said gear train including a power crank shaft, and means operable upon the hardening of the contents of said pan unit for automatically stopping rotation of said power crank shaft to effect release of said clutch.

7. In an ice cream freezer for mechanical refrigerators having freezing units, a pan unit and a power unit, means holding said pan unit in the freezing unit of a refrigerator, means holding said power unit on the door of the refrigerator to cooperate with the pan unit, said power unit comprising a motor, a gear train including a clutch device having means to release itself upon a predetermined resistance being encountered, said gear train including a power crank shaft, and means operable upon the hardening of the contents of said pan unit for stopping rotation of said power crank shaft to effect release of said clutch, said last named means comprising an articulated crank, a toggle spring cooperatively connecting the articulations of the crank, a shiftable stop lug carried by one of said articulations, and a fixedly located stop lug engageable by said shiftable lug when the articulations of the crank member assume a particular angle to each other.

8. An ice cream freezer for mechanical refrigerators having freezing units, a pan unit and a power unit, means holding said pan unit in the freezing unit of a refrigerator, means holding said power unit on the door of the refrigerator to cooperate with the pan unit, said power unit comprising a motor, a gear train including a clutch device having means to release itself upon a predetermined resistance being encountered, said gear train including a power crank shaft, and means operable upon the hardening of the contents of said pan unit for stopping rotation of said power crank shaft to effect release of said clutch, said last named means comprising an articulated crank, a toggle spring cooperatively connecting the articulations of the crank, a shiftable stop lug carried by one of said articulations, and a fixedly located stop lug engageable by said shiftable lug when the articulations of the crank member assume a particular angle to each other, one of said articulations comprising a spring arm having a crank-like member at one end and said pan unit including a suitable stirring member with a crank shaft whose crank is arranged to cooperate with said crank-like member.

9. The combination with the freezing unit and the door of a refrigerator, of an open top pan insertable in the freezing unit, a shaft journalled in bearings at the ends of said pan and carrying a scraper blade to engage the inner wall of said pan, a power applying unit mounted on the door of the refrigerator and itself including a motor located on the outside of the door, a driven shaft journalled in a bearing in the wall of the door and passing through the wall of the same, and a crank on said driven shaft, and an arm on said first mentioned shaft to be engaged by said crank when the door has closed allowing for a variable location of said first mentioned shaft due to more or less frost on the freezing unit, for the purposes described.

10. In an ice cream freezer for mechanical refrigerators having freezing units, a pan unit and a power unit, means holding said pan unit in the freezing unit of a refrigerator, means holding said power unit on the door of the refrigerator to cooperate with the pan unit, said pan unit including a receptacle and a rotary stirring paddle therein, said power unit including an electric motor located on the outside of the refrigerator, a driving shaft piercing the refrigerator door, and crank connections between said driving shaft and said stirring paddle, the axis of said driving shaft being offset in the direction of the crank on stirring paddle shaft when paddle is in the lowest portion of pan, thereby giving the driving crank more power for driving the scraper paddle through the mixture and increasing its rate of travel when out of the mixture, said crank being of sufficient length so as to provide for the variable location of the paddle shaft due to more or less frost on the freezing unit.

11. In an ice cream freezer for mechanical refrigerators having freezing units, a pan unit and a power unit, means holding said pan unit in the freezing unit of a refrigerator, means holding said power unit on the door of the refrigerator to cooperate with the pan unit, said pan unit including a receptacle and a rotary stirring paddle therein, said power unit including an electric motor located on the outside of the refrigerator, a driving shaft piercing the refrigerator door, crank connections between said driving shaft and said stirring paddle, said power unit including a power shut-off means governed by resistance of a predetermined degree to the turning of said paddle as the material hardens, the axis of said driving shaft and the axis of said paddle being offset in the direction of the crank on stirring paddle shaft when paddle is in the lowest portion of pan, thereby giving the driving crank more power for driving the scraper paddle through the mixture and increasing its rate of travel when out of the mixture, said crank being of sufficient length so as to provide for the variable location of the paddle shaft due to more or less frost on the freezing unit.

12. In an ice cream freezer for mechanical refrigerators having freezing units, a pan unit and a power unit, means holding said pan unit in the freezing unit of a refrigerator, means holding said power unit on the door of the refrigerator to cooperate with the pan unit, said pan unit including a receptacle and a rotary stirring paddle therein, said power unit comprising a motor, a gear train including a clutch device having means to release itself upon a predetermined resistance being encountered, said gear train including a power crank shaft, and means operable upon the hardening of the contents of said pan unit for stopping rotation of said power crank shaft to effect release of said clutch, the axis of said driving shaft and the axis of said paddle being offset allowing for a variable location of the paddle shaft due to more or less frost on the freezing unit.

13. The combination with the freezing unit and a door of a refrigerator, of a pan insertable into the freezing unit, a rotatable scraper paddle mounted in the pan and including an operating shaft, and a power applying unit mounted on the door for actuating said paddle when the door is closed, said power applying unit including a motor on the outside of the door, a motor driven shaft journalled in the wall of said door and a flexible connection between said motor driven shaft and the shaft of said paddle, the axis of said motor driven shaft lying in a different horizontal plane than that in which the axis of the paddle shaft lies.

LUCIUS A. LINDSEY.